(12) United States Patent
LaCroix

(10) Patent No.: US 7,294,163 B1
(45) Date of Patent: Nov. 13, 2007

(54) CARTRIDGE FILTER

(76) Inventor: Paul E. LaCroix, 11201 Ampere Ct., Louisville, KY (US) 40299

( * ) Notice: Subject to any disclaimer, the term of this patent is extended or adjusted under 35 U.S.C. 154(b) by 304 days.

(21) Appl. No.: 11/084,883

(22) Filed: Mar. 21, 2005

(51) Int. Cl.
   *B01D 46/00* (2006.01)
(52) U.S. Cl. .............................. 55/498; 55/378; 55/502
(58) Field of Classification Search .................. 55/498, 55/502, 508, 378, 379, 341.1, 484, 374, 376, 55/377
   See application file for complete search history.

(56) References Cited

U.S. PATENT DOCUMENTS

| | | | |
|---|---|---|---|
| 4,073,632 A | 2/1978 | Reinauer et al. | |
| 4,138,234 A * | 2/1979 | Kubesa | 55/374 |
| 4,159,197 A * | 6/1979 | Schuler et al. | 55/379 |
| 4,184,966 A | 1/1980 | Pall | |
| 4,220,459 A * | 9/1980 | Hammond et al. | 55/341.1 |
| 4,276,069 A * | 6/1981 | Miller | 55/379 |
| 4,293,321 A | 10/1981 | Kordas | |
| 4,559,138 A | 12/1985 | Harms, II | |
| 4,765,811 A * | 8/1988 | Beckon | 55/498 |
| 4,954,255 A | 9/1990 | Muller et al. | |
| 5,066,318 A * | 11/1991 | McDonough | 55/502 |
| 5,202,021 A * | 4/1993 | Griffin et al. | 210/232 |
| 5,207,811 A | 5/1993 | Buonpastore | |
| 5,207,812 A | 5/1993 | Tronto et al. | |
| 5,211,846 A | 5/1993 | Kott et al. | |
| 5,290,441 A * | 3/1994 | Griffin et al. | 210/232 |
| 5,308,485 A | 5/1994 | Griffin et al. | |
| 5,660,608 A * | 8/1997 | Bartholome | 55/498 |
| 5,730,766 A * | 3/1998 | Clements | 55/341.1 |
| 5,885,314 A | 3/1999 | Oussoren et al. | |
| 5,964,909 A | 10/1999 | Brunner | |
| 6,007,608 A | 12/1999 | Johnson | |
| 6,017,378 A | 1/2000 | Oussoren et al. | |
| 6,017,379 A * | 1/2000 | Kauffman | 55/496 |
| 6,203,591 B1 * | 3/2001 | Clements et al. | 55/341.1 |
| RE37,163 E | 5/2001 | Oussoren et al. | |
| 6,299,662 B1 * | 10/2001 | Poulsen | 55/498 |
| 6,358,292 B1 * | 3/2002 | Clements | 55/498 |
| 6,508,934 B2 * | 1/2003 | Van Pelt et al. | 210/232 |
| 6,726,735 B1 | 4/2004 | Oussoren et al. | |
| 6,787,031 B2 * | 9/2004 | Van Pelt et al. | 210/232 |
| 7,186,284 B2 * | 3/2007 | Clements | 55/377 |
| 2004/0237483 A1 * | 12/2004 | Clements | 55/341.1 |
| 2005/0178097 A1 * | 8/2005 | Clements | 55/378 |

FOREIGN PATENT DOCUMENTS

WO    WO90/11116    10/1990

\* cited by examiner

*Primary Examiner*—Duane Smith
*Assistant Examiner*—Robert A Clemente
(74) *Attorney, Agent, or Firm*—Theresa Fritz Camoriano; Camoriano and Associates

(57) ABSTRACT

A cartridge filter has a unitary upper fitting and a separate gasket which permits a single base filter to be used with a wide range of tube sheet openings, simply by selecting the appropriate gasket. In one embodiment, the gasket is bonded to the unitary upper fitting. In another embodiment, the tubular side wall of the unitary upper fitting defines an annular step, and the gasket defines a bottom edge, at least a portion of which rests on the step.

8 Claims, 11 Drawing Sheets

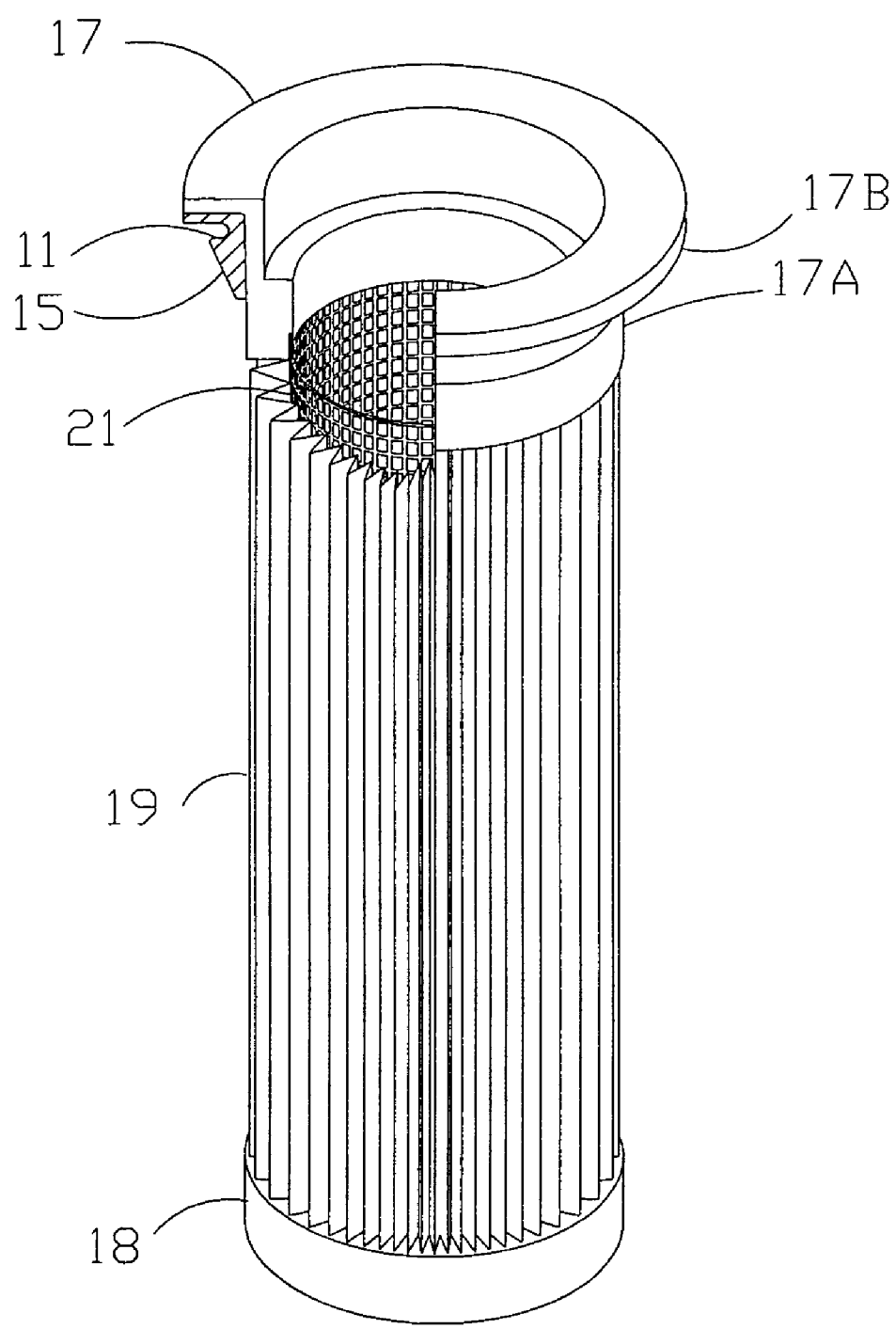

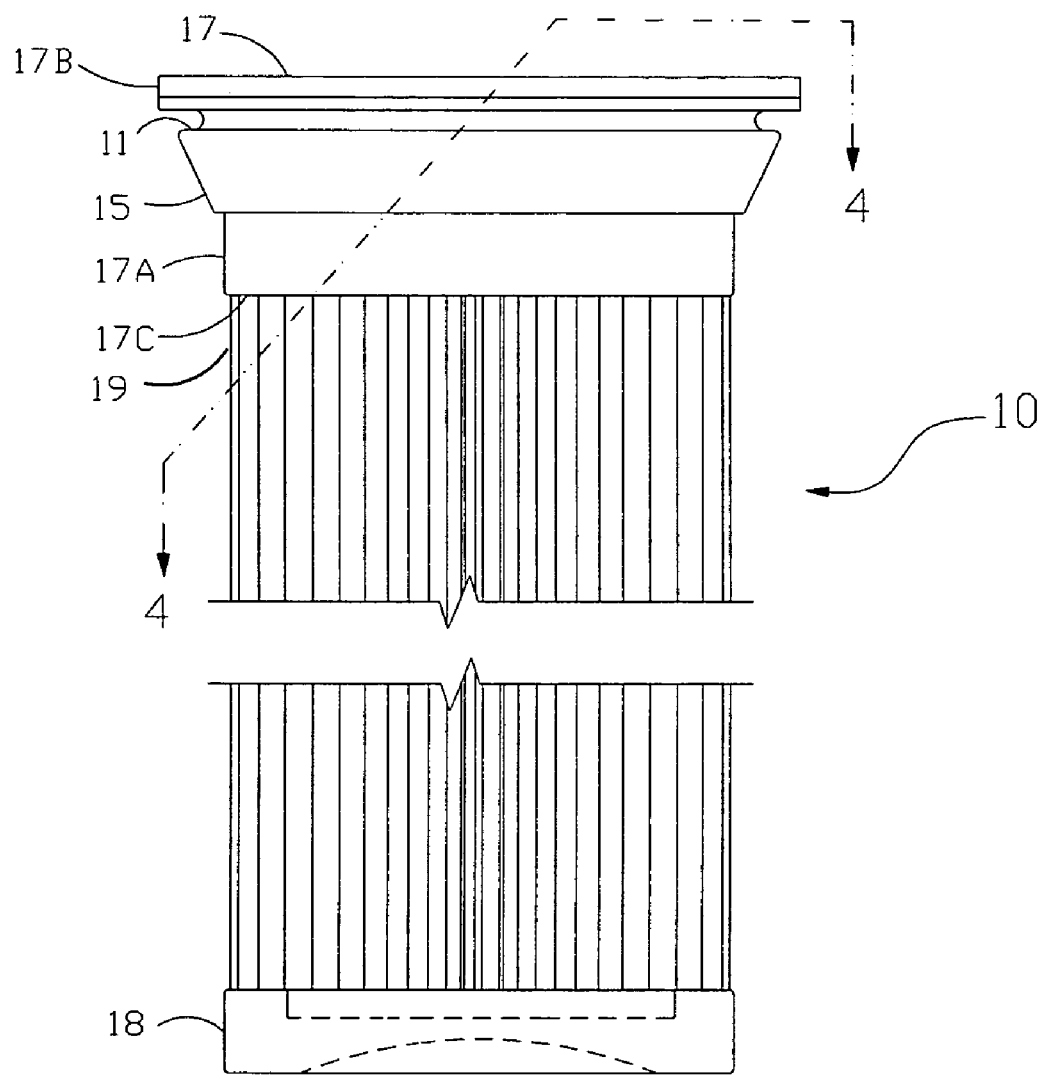

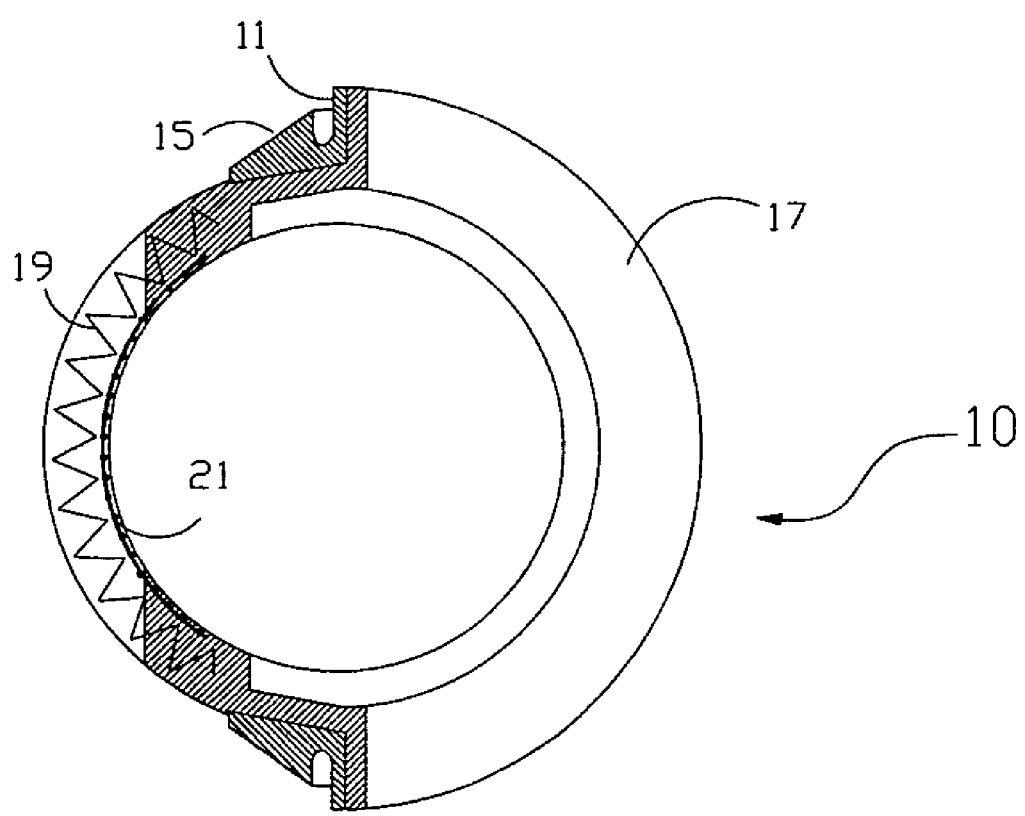

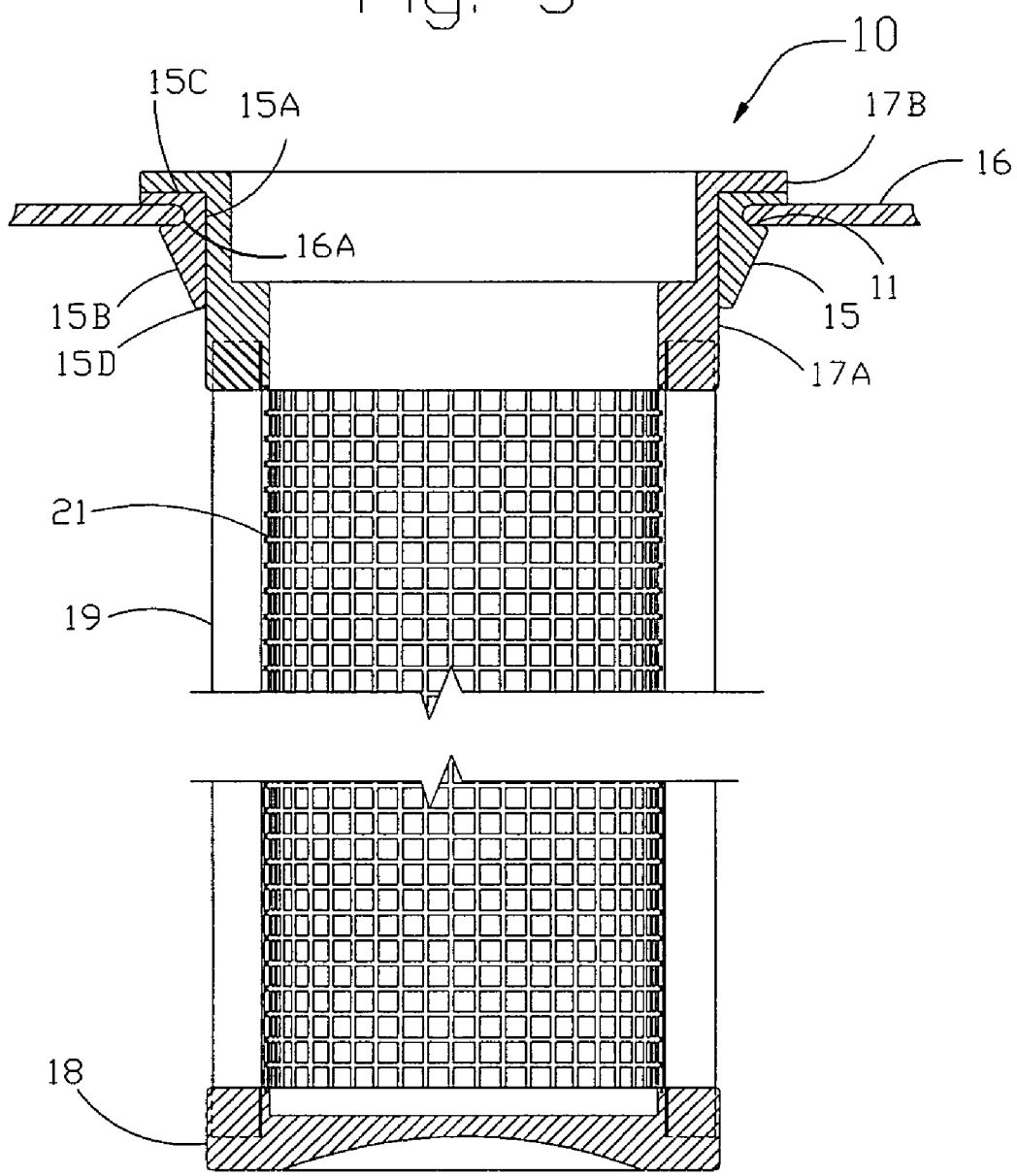

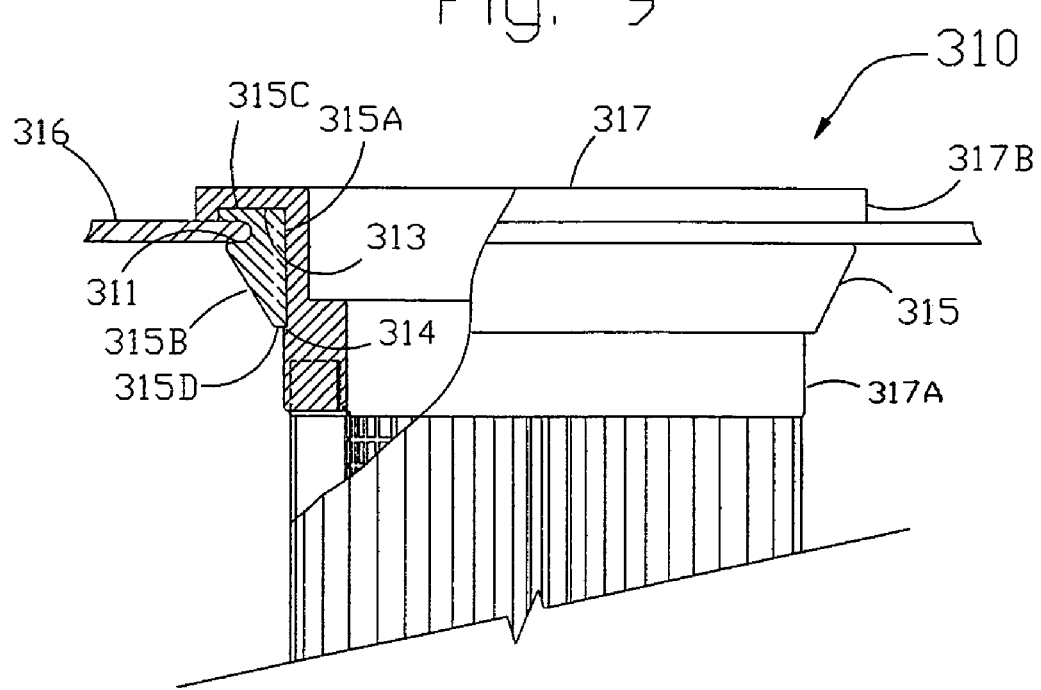

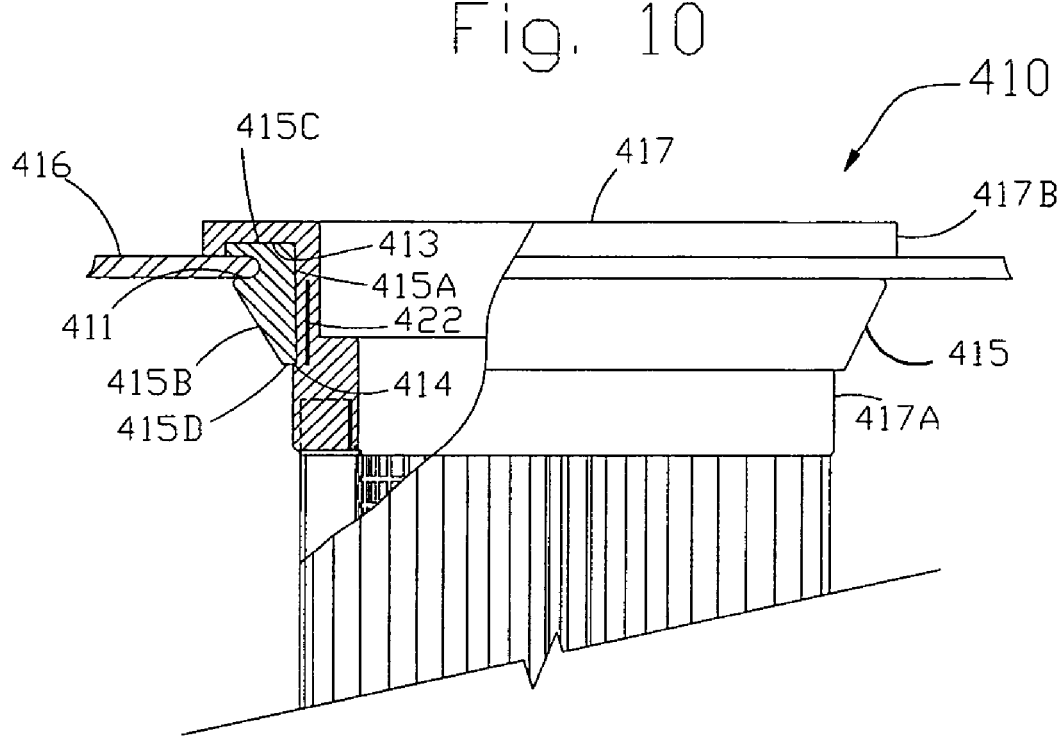

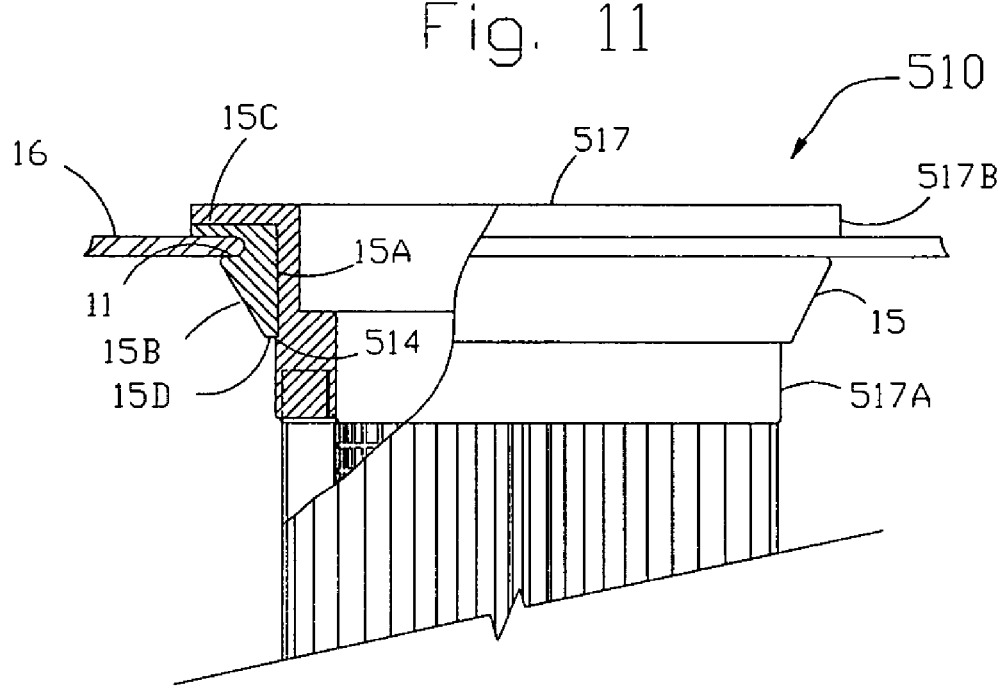

CARTRIDGE FILTER

BACKGROUND

Cartridge filters are used for the removal of particulate matter from a fluid stream in a wide range of industrial and commercial applications. Typically, the cartridge filters are contained in a baghouse. The baghouse is basically a housing divided into top and bottom chambers by a plate or tube sheet. The tube sheet has openings, and the cartridge filters are inserted into the openings. The "dirty" fluid stream is blown into the bottom chamber of the baghouse, where it passes through the cartridge filters to the top chamber. The filters remove the particulates from the stream. There may be variations in the tube sheets depending upon the application. For instance, various thicknesses of metal may be used, and the openings may have different sizes and shapes.

BRIEF SUMMARY

The embodiments that are shown and described herein allow standard sized filters to be adapted for use with tube sheets having a wide range of specifications. This is accomplished by using a variety of gaskets in conjunction with a universal fitting molded to the filter media. It is contemplated that just a few universal fittings will be able to accommodate most tube sheet openings.

When cartridges are being replaced, the filter system is generally inoperative, causing the manufacturing or chemical process to be halted or shut down. Thus, it is important to be able to replace the cartridges quickly. Due to the wide range of sizes and shapes of tube sheet openings, filter manufacturers typically do not attempt to carry all the different sizes of filter cartridges in inventory, and it may take weeks to manufacture a cartridge to fit a particular tube sheet opening. This means that the chemical process or other manufacturing process may be shut down or partially inoperative for weeks while waiting for the appropriate filters to be made. By using a filter with a universal fitting in conjunction with a number of gaskets, it will be possible to keep only a few different types of filters in stock and still be able to provide filters on short notice for a wide range of tube sheets when the time sensitive maintenance is performed. When the filters are requested, a gasket sized for the exact specifications simply is mounted onto the filter, and the customized filter then can be shipped to the customer without delay.

Another advantage of using a gasket in conjunction with the fitting is that the fitting and gasket can be made of different materials, each having properties that are suited to their function. For example, the fitting may be made of a stiffer material, so the flange on the fitting provides good structural support for the filter on the tube sheet to reduce problems with rocking or shifting of the filter relative to the tube sheet, while the gasket may be made of a softer, more flexible material, designed to provide a good seal. While this general type of filter typically uses a fitting made of a polymeric material, it is also contemplated that ceramics or other materials could be used, especially in environments where the filter is subjected to high temperatures.

BRIEF DESCRIPTION OF THE DRAWINGS

FIG. 2 is a perspective view partially in section of one embodiment of a cartridge filter made in accordance with the present invention;

FIG. 3 is a side view of the cartridge filter of FIG. 2;

FIG. 4 is a view taken along the line 4-4 of FIG. 3;

FIG. 5 is a sectional view of the cartridge filter of FIG. 2;

FIG. 9 is a broken-away view partially in section of still another embodiment of a cartridge filter made in accordance with the present invention;

FIG. 10 is a broken-away view partially in section of still another embodiment of a cartridge filter made in accordance with the present invention; and FIG. 11 is a broken-away view partially in section of still another embodiment of a cartridge filter made in accordance with the present invention.

DETAILED DESCRIPTION OF THE PREFERRED EMBODIMENTS

Figure 1:
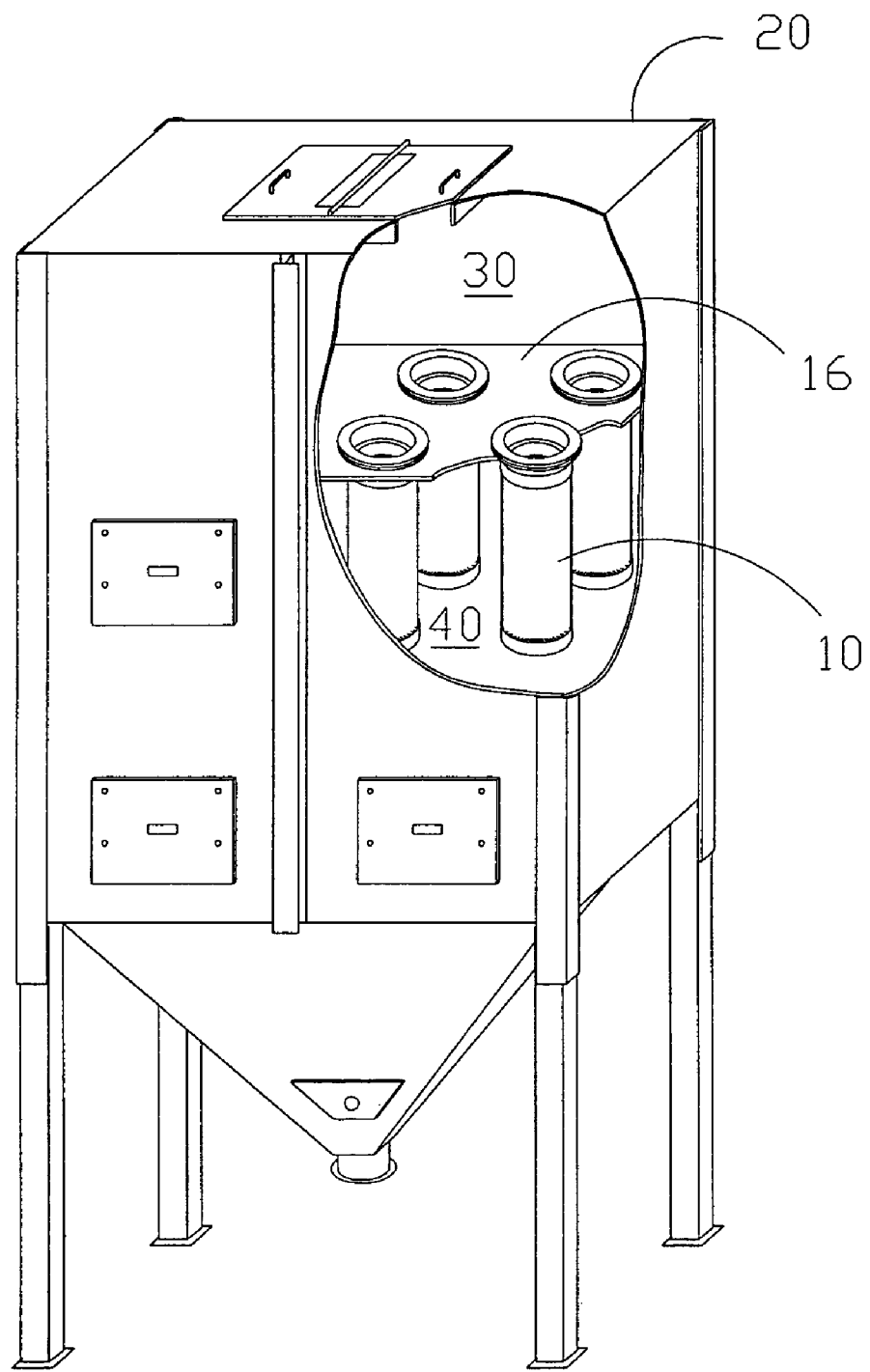
FIG. 1 is a perspective view of a typical baghouse with tube sheet and cartridge filters.

FIGS. 1-5 show one embodiment of a cartridge filter 10 made in accordance with the present invention. FIG. 1 shows the cartridge filter 10 in a typical industrial baghouse 20 for removing particulate matter from an air stream; however, it is envisioned that the filter 10 could be used in many other filtration applications as well.

Referring to FIG. 1, the baghouse 20 is separated into an upper chamber 30 and a lower chamber 40 by a tube sheet 16, having several openings. A cartridge filter 10 is placed in each of the openings in the tube sheet 16. Air laden with particulate matter (dirty air) enters the baghouse 20 through the lower chamber 40. The air passes radially inwardly through the cartridge filters 10, where the particulate matter is removed, and the resulting clean air continues out the top of the cartridge filter 10 and into the upper chamber 30 before ultimately exiting the baghouse 20. In order for the baghouse 20 to work effectively, there should be a good seal between the cartridge filter 10 and the tube sheet 16. Otherwise, the dirty air could move directly from the lower chamber 40 to the upper chamber 30 and bypass the cartridge filter 10.

FIG. 2 is a broken-away perspective view of the cartridge filter 10 showing the major components. The cartridge filter 10 includes a pleated, tubular filter medium 19, a tubular screen 21, a unitary upper fitting 17, a blind cap 18, and a gasket 15. The tubular filter medium 19 may be made of various materials and may have various shapes depending on the specific filtering application. In this instance, the tubular filter medium 19 has a cylindrical shape and is pleated. Other cross-sectional shapes, such as an oval shape, are known in the art and could be used in the present invention.

Abutting the tubular filter medium 19 on the inside is a tubular screen 21. The tubular screen 21 is a sturdy frame which provides support for the generally less rigid filter medium 19. The tubular screen 21 may be constructed of metal or plastic or other suitable materials. (If the filter medium 19 were rigid enough by itself, the screen 21 would not be required.) The upper fitting 17 and the blind cap 18 are molded directly onto the tubular screen 21 and the filter medium 19, embedding the respective upper ends of the tubular screen 21 and the filter medium 19 into the upper fitting 17 and their respective lower ends into the blind cap 18.

The unitary upper fitting 17 is molded in a single piece and has a tubular side wall 17A and a flange 17B. The flange 17B projects perpendicularly outwardly from the upper edge of the tubular side wall 17A. The result is a single cartridge unit including the filter medium 19, screen 21, blind cap 18, and upper fitting 17. Although this embodiment includes the blind cap 18 to seal the bottom end of the filter 10, it is also within the scope of this invention to have a filter without the bottom cap 18. For instance, the filter medium 19 may be formed into a sock or bag shape which would eliminate the need for the bottom cap 18.

The cartridge filter 10 also includes a separate gasket 15, which is molded as a separate piece from the upper fitting 17. The gasket 15 provides a seal between the cartridge filter 10 and the opening 16A in the tube sheet 16 (see FIG. 5). The relationship between the gasket 15, the upper fitting 17, and the tube sheet 16 will be explained in greater detail later.

FIG. 3 is a side view of the cartridge filter of FIG. 2, showing the unitary upper fitting 17, including a tubular side wall 17A, flange 17B, and bottom edge 17C.

FIG. 4 is a view taken along the line 4-4 of FIG. 3. It helps illustrate the relationship between the pleated filter medium 19, screen 21, upper fitting 17, and gasket 15. It can be seen in this view that the upper fitting 17 has been molded directly onto the pleated filter medium 19 and screen 21, so the filter medium 19 and screen 21 are embedded a substantial distance up into the upper fitting 17, providing a substantial surface area of contact for securing them together. This can also be seen in FIG. 5, which shows the pleated filter medium 19 and the screen 21 extending a substantial distance into the upper fitting 17.

FIG. 5 is a sectional view of the cartridge filter 10 showing it fitted into the opening 16A in the tube sheet 16. FIG. 5 best shows the details of the gasket 15. The gasket 15 is essentially a flexible ring sized to fit closely around the upper fitting 17 below the flange 17B. It has an inner surface 15A, outer surface 15B, top surface 15C, and bottom surface 15D. The diameter of the inner surface 15A is essentially equal to or slightly less than the diameter of the tubular side wall 17A of the upper fitting 17 so that the inner surface 15A of the gasket 15 abuts the tubular side wall 17A of the upper fitting with a tight or interference fit. Also, the top surface 15C of the gasket 15 abuts the bottom surface of the flange 17B of the upper fitting 17. These two large contact surface areas between the gasket 15 and the upper fitting 17 ensure a good seal between them. The seal may depend entirely on a tight fit between the gasket 15 and the upper fitting 17, or additional measures may be taken to ensure a seal as will be described later.

The outer surface 15B of the gasket 15 seals against the opening 16A in the tube sheet 16. The outer surface 15B is generally tapered, with the bottom edge of the outer surface 15B having a diameter less than the diameter of the opening 16A in the tube sheet 16 and the portion of the outer surface 15B that lies directly above the tube sheet 16 having a diameter greater than the opening 16A in the tube sheet 16. This facilitates insertion of the cartridge filter 10 into the tube sheet opening 16A. The filter 10 can be pushed downwardly into the opening 16A of the tube sheet, slightly deforming the gasket 15, and creating a good seal between the outer surface 15B of the gasket and tube sheet 16.

In this embodiment, the outer surface 15B of the gasket 15 also has an annular groove or recess 11, which receives the tube sheet 16 to improve the seal between the filter 10 and the tube sheet 16. The size of the groove 11 may be customized for the particular opening in the tube sheet 16. Typically, the groove 11 has a depth such that the diameter of the gasket 15 inside the groove 11 in an unstressed state is slightly greater than the diameter of the tube sheet opening 16A. Further, the height of the groove 11 in an unstressed state is typically slightly less than the thickness of the tube sheet 16. As a result, the material in the gasket 15 surrounding the groove 11 expands slightly upwardly, downwardly, and inwardly in order to receive the tube sheet 16 at the opening 16A. The flexible gasket 15 conforms to the tube sheet opening 16A such that it contacts the top surface, bottom surface, and inside opening surface 16A of the tube sheet 16 with a tight, sealing fit.

Tube sheets have a wide range of thicknesses and opening dimensions depending on the industry or application. With the design shown here, the gasket can be independently customized to fit a specific tube sheet without having to modify the entire cartridge filter. Thus, this design allows a single unitary base structure including the filter medium, screen, and upper fitting to be used with a wide range of gaskets in order to fit a wide range of tube sheet openings.

This cartridge filter 10 is made as described below. The cartridge filter manufacturer first makes the unitary base structure by molding the upper fitting 17 and blind cap 18 directly onto the filter medium 19 and screen 21. The manufacturer may maintain a large inventory of this unitary base structure. When an order is received from a customer, the manufacturer either makes a new gasket 15 or uses a gasket 15 in stock that meets the customer's specifications. He then pushes the gasket 15 over the blind cap 18, slides it along the length of the filter medium 19, and pushes it up against the flange 17B of the upper fitting 17. The gasket 15 may then be bonded to the upper fitting by any of a number of means, such as by melting it to the surface of the upper fitting 17 or by using an adhesive or by a mechanical means. Alternatively, the gasket 15 may be held in place without bonding, such as by friction. To make it easier to install the gasket 15 over the blind cap 18 and upper fitting 17 while still having a snug fit, the inner surface of the gasket may be slightly tapered from top to bottom, having a slightly larger inside diameter at the top than at the bottom. For instance, in this embodiment there is a one degree offset. After the gasket 15 is mounted onto the upper fitting 17, the finished product is ready for installation into its respective opening 16A.

Figure 6A:
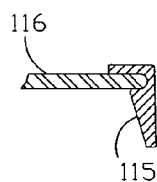
FIGS. 6A-6G are sectional views of various gaskets that may be alternatively used with the cartridge filter of FIG. 2, showing how those gaskets fit into their respective tube sheet openings.
Figure 6B:
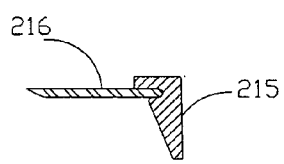
Figure 6C:
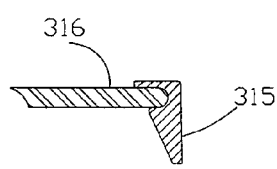
Figure 6D:
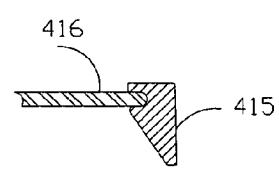
Figure 6E:
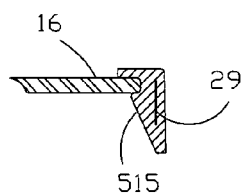
Figure 6F:
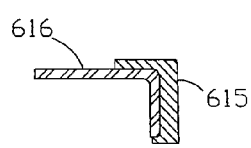
Figure 6G:
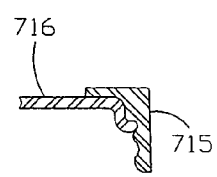

FIGS. 6A-6G are sectional views showing a variety of gaskets installed in a variety of corresponding tube sheets. Any of these gaskets may be installed on the upper fitting 17 to adapt it to a particular tube sheet opening. For example, FIG. 6A shows a gasket 115 intended to fit a tube sheet opening 116 that has a diameter only slightly larger than the diameter of the upper fitting 17, while FIG. 6B shows a gasket 215 for a tube sheet 216 having a larger diameter opening, where the tube sheet 216 is made of a thinner material. FIG. 6C shows a gasket 315 for a tube sheet 316 made of a relatively thick material. FIG. 6D shows a gasket 415 for a tube sheet 416 with an opening that has a substantially larger diameter than the diameter of the upper fitting 17. FIG. 6E shows a gasket 515 which includes a metallic belt 29 embedded in the gasket 515 to provide additional support. FIG. 6F shows a gasket 615 for a special type of tube sheet 616 that has a downwardly extending collar at each tube sheet opening. In that case, the gasket 615 defines a recess that is shaped to receive that collar. FIG. 6G shows a gasket 715 for a tube sheet 716 in which each tube sheet opening has a downwardly extending collars with an inwardly extending lip. Again, the gasket 715 has a special outer contour to receive that collar.

It is understood that other gaskets not shown or described may also be used depending on the particular application. It is further understood that the base cartridge itself may be made in different sizes and shapes in order to accommodate a wider range of tube sheet openings. In the case of oval tube sheet openings, it is contemplated that the base cartridge and the annular gaskets would be made with an oval cross section.

Figure 7:
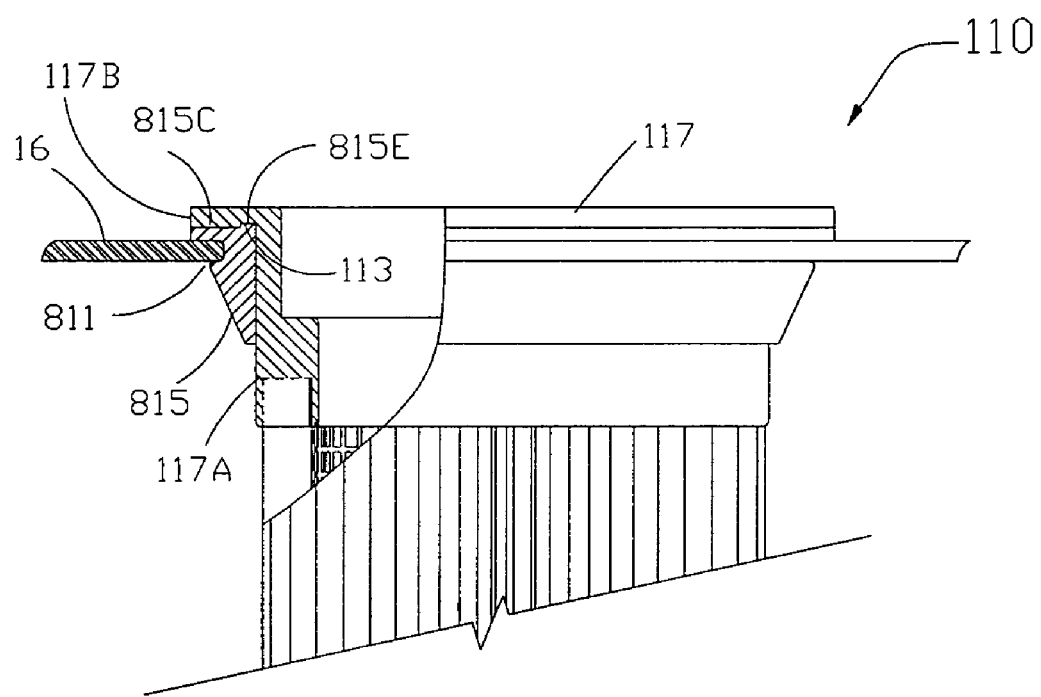
FIG. 7 is a broken-away view partially in section of another embodiment of a cartridge filter made in accordance with the present invention.

FIG. 7 shows an alternate embodiment of a cartridge filter 110 made in accordance with the present invention. This embodiment is the same as the filter 10 of FIGS. 1-5, except that, in this embodiment, the flange 117B of the upper fitting 117 defines a small upwardly-directed recess 113 where it meets the cylindrical side wall 117A, and the gasket 815 has a corresponding upwardly-directed projection 815E that fits into the recess 113. When the recess 113 receives the projection 815E, it provides additional radial restraint for the gasket 815. As with the previously-described filter 10, the top surface 815C of the gasket 815 abuts the bottom surface of the flange 117B of the fitting 117, and the outer surface of the gasket 815 is tapered and defines an annular groove 811 sized for a tube sheet 16. It should be noted, however, that a pre-formed groove is not required in every situation, and the tube sheet 16 may simply form its own recess in the gasket just by compressing the gasket.

Figure 8:
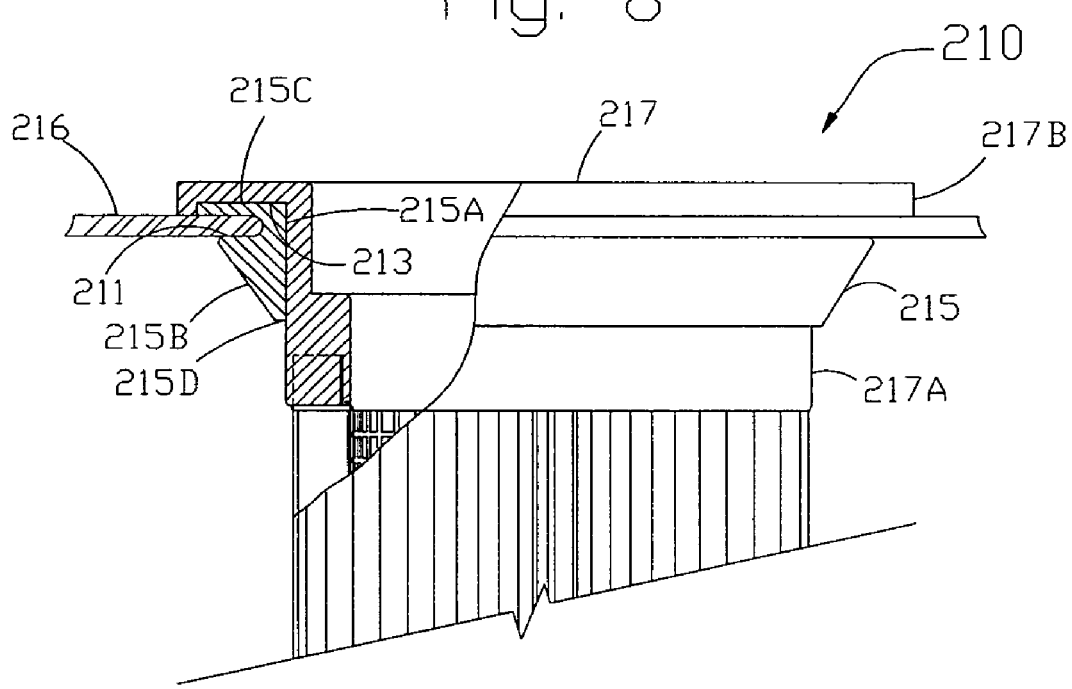
FIG. 8 is a broken-away view partially in section of still another embodiment of a cartridge filter made in accordance with the present invention.

FIG. 8 shows another embodiment of a cartridge filter 210 made in accordance with the present invention. As in the previous filter embodiment 110 described in FIG. 7, there is a recess 213 in the bottom surface of the flange 217B of the upper fitting 217. However, in this embodiment, the recess 213 is wider, and the gasket 215 does not have a vertical projection. Instead, the entire top surface 215C of the gasket 215 is received in the recess 213. The portion of the gasket 215 between the groove 211 and the upper surface 215C should have a height greater than the height of the recess, so that the gasket is compressed and provides a good seal. As in the previous embodiments, the top surface 215C of the gasket 215 abuts the bottom surface of the flange 217B, and the inner surface 215A of the gasket 215 abuts the tubular side wall 217A of the fitting 217. The outer surface 215B of the gasket 215 is tapered from the bottom surface 215D of the gasket 215 to a groove 211 in the outer surface 215B, which receives the tube sheet 216.

FIG. 9 shows yet another embodiment of a cartridge filter 310 made in accordance with the present invention. In this embodiment, not only does the flange 317B of the upper fitting 317 have the previously described recess 313 which receives the upper surface 315C of the gasket 315, but the tubular side wall 317A of the upper fitting 317 also has a step or shoulder 314, and at least a portion of the bottom surface 315D of the gasket 315 rests on the step 314 so that the step 314 provides vertical retraint for the gasket 315, preventing the gasket 315 from shifting downwardly relative to the fitting 317 once it is installed on the fitting 317. The gasket 315 may be simply press-fit into place, or it may be press fit and bonded to the upper fitting 317. The outer surface 315B of the gasket 315 is tapered to facilitate installation of the filter 310 into the tube sheet opening, and it includes a groove 311 to receive the tube sheet 316 at the opening.

The gasket 315 of FIG. 9 also has an inner surface 315A.

FIG. 10 shows still another embodiment of a cartridge filter 410 made in accordance with the present invention. Here, a metallic belt 422 has been embedded in the upper fitting 417 during the molding process. The metallic belt 422 provides additional rigidity to the upper fitting 417 in order to help maintain a good seal between the fitting 417 and the gasket 415 over time. To elaborate, after the gasket 415 has been mounted on the upper fitting 417 (specifically, by engaging the top surface 415C of the gasket 415 with the recess 413 in the flange 417B and engaging the bottom surface 415D of the gasket 415 with the step 414 in the tubular wall 417A) and the gasket 415 is engaged with the tube sheet 416 (specifically, by engaging the groove 411 in the outer surface 415B of the gasket 415 with the tube sheet 416), there is generally an inwardly directed force on the tubular wall 417A of the upper fitting 417. The embedded belt 422 in the upper fitting 417 helps prevent the upper fitting 417 from deforming inwardly, which in turn helps ensure that a good seal is maintained between the inner surface 415A of the gasket 415 and the tubular wall 417A of the upper fitting 417. It also helps ensure a good seal between the top surface 415C of the gasket 415 and the flange 417B of the upper fitting 417. Similar types of reinforcement may be used in various positions in any of the filter designs, including in the blind cap.

FIG. 11 shows still another embodiment of a cartridge filter 510 made in accordance with the present invention. Similar to the first embodiment of a filter 10 shown in FIGS. 1 to 5, there is no recess in the flange 517B of the upper fitting 517. However, similar to the filter 310 in FIG. 9, there is a step 514 in the side wall 517A of the upper fitting 517, which helps restrain the gasket 15 in the vertical direction. At least a portion of the bottom surface 15D of the gasket 15 rests on the step 514 of the upper fitting 517, and the inner surface 15A of the gasket 15 abuts the tubular wall 517A of the upper fitting 517 between the step 514 and the flange 517B.

It will be obvious to those skilled in the art that modifications may be made to the embodiments described above without departing from the scope of the present invention.

What is claimed is:

1. A cartridge filter to be removably received in a tube sheet opening, comprising:
 a tubular filter medium having an open upper end;
 a unitary upper fitting into which the upper end of said filter medium is embedded, said unitary upper fitting projecting upwardly from said upper end of said filter medium and including a tubular side wall having an upper edge and an outer surface, and a flange projecting outwardly from said outer surface at said upper edge; and
 an annular gasket surrounding the outer surface of said tubular side wall, said gasket being in sealing engagement with said tubular side wall and having an outer surface for sealing against the tube sheet opening, wherein said gasket is bonded to said unitary upper fitting.

2. A cartridge filter to be removably received in a tube sheet opening, comprising:
 a tubular filter medium having an open upper end;
 a unitary upper fitting into which the upper end of said filter medium is embedded, said unitary upper fitting projecting upwardly from said upper end of said filter medium and including a tubular side wall having an upper edge and an outer surface, and a flange projecting outwardly from said outer surface at said upper edge; and
 an annular gasket surrounding the outer surface of said tubular side wall, said gasket being in sealing engagement with said tubular side wall and having an outer surface for sealing against the tube sheet opening;

wherein said outer surface of said gasket defines a groove for receiving the tube sheet at the tube sheet opening;

wherein said gasket has a bottom, and the outer surface of said gasket tapers from a smaller diameter at said bottom to a larger diameter just below said groove; and wherein said gasket is bonded to said unitary upper fitting.

3. A cartridge filter to be removably received in a tube sheet opening, comprising:

a tubular filter medium having an open upper end;

a unitary upper fitting into which the upper end of said filter medium is embedded, said unitary upper fitting projecting upwardly from said upper end of said filter medium and including a tubular side wall having an upper edge and an outer surface, and a flange projecting outwardly from said outer surface at said upper edge; and an annular gasket surrounding the outer surface of said tubular side wall, said casket being in sealing engagement with said tubular side wall and having an outer surface for sealing against the tube sheet opening;

wherein the tubular side wall of said unitary upper fitting defines an annular step, and said gasket defines a bottom edge, at least a portion of which rests on said step.

4. A cartridge filter to be removably received in a tube sheet opening as recited in claim 3, wherein said gasket has an interference fit with the unitary upper fitting.

5. A cartridge filter to be removably received in a tube sheet opening as recited in claim 3, wherein said gasket is bonded to the unitary upper fitting.

6. A cartridge filter to be removably received in a tube sheet opening as recited in claim 3, wherein said outer surface of said gasket defines a groove and said outer surface is tapered from a smaller diameter at the bottom edge of the gasket to a larger diameter just below said groove.

7. A method of forming a cartridge filter to be removably received in a tube sheet opening, comprising the steps of:

molding a tubular upper fitting onto a tubular filter medium and tubular screen, said tubular upper fitting including a tubular side wall and an outwardly projecting flange;

mounting a tubular gasket around said tubular side wall below said flange, said tubular gasket having an upper surface in sealing engagement with said flange, an inner surface in sealing engagement with said tubular side wall, and an outer surface for sealing against the tube sheet opening; and bonding said gasket to said upper fitting.

8. A filter arrangement, comprising:

a tube sheet having a top surface and a bottom surface and defining at least one opening having an edge; and a cartridge filter mounted in said opening, including a tubular filter medium having an open upper end;

a tubular screen positioned inside said tubular filter medium, said tubular screen also having an open upper end;

a unitary upper fitting secured to the upper ends of said filter medium and said screen and projecting upwardly therefrom, said unitary upper fitting including a tubular side wall defining an upper edge, an outer surface, and an upper flange projecting outwardly from said upper edge; and an annular gasket mounted around the tubular side wall of said upper fitting below said upper flange, said gasket having an inner surface in sealing engagement with said tubular side wall, a top surface in sealing engagement with said flange, and an outer surface defining a recess which receives the edge of said tube sheet opening and seals against the top surface, bottom surface, and edge of said tube sheet at said tube sheet opening;

wherein said gasket is bonded to said unitary upper fitting.

* * * * *

UNITED STATES PATENT AND TRADEMARK OFFICE
CERTIFICATE OF CORRECTION

| | | |
|---|---|---|
| PATENT NO. | : 7,294,163 B1 | Page 1 of 1 |
| APPLICATION NO. | : 11/084883 | |
| DATED | : November 13, 2007 | |
| INVENTOR(S) | : Paul E. LaCroix | |

It is certified that error appears in the above-identified patent and that said Letters Patent is hereby corrected as shown below:

Claim 1, line 45, delete "protecting" and insert therefor --projecting--.

Claim 3, line 18, delete "casket" and insert therefor --gasket--.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,294,163 B1  Page 1 of 1
APPLICATION NO. : 11/084883
DATED : November 13, 2007
INVENTOR(S) : Paul E. LaCroix It is certified that error appears in the above-identified patent and that said Letters Patent is hereby corrected as shown below:

Column 6, Claim 1, line 45, delete "protecting" and insert therefor --projecting--.

Column 7, Claim 3, line 18, delete "casket" and insert therefor --gasket--.

This certificate supersedes the Certificate of Correction issued August 19, 2008.

Signed and Sealed this

Sixteenth Day of September, 2008

JON W. DUDAS
*Director of the United States Patent and Trademark Office*